US012695336B2

(12) United States Patent
Itonaga et al.

(10) Patent No.: US 12,695,336 B2
(45) Date of Patent: Jul. 28, 2026

(54) POWER SUPPLY SYSTEM

(71) Applicant: Murata Machinery, Ltd., Kyoto (JP)

(72) Inventors: Seizo Itonaga, Inuyama (JP); Hiroyasu Tomita, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 19/117,110

(22) PCT Filed: Aug. 15, 2023

(86) PCT No.: PCT/JP2023/029535
§ 371 (c)(1),
(2) Date: Mar. 31, 2025

(87) PCT Pub. No.: WO2024/075403
PCT Pub. Date: Apr. 11, 2024

(65) Prior Publication Data
US 2026/0128620 A1 May 7, 2026

(30) Foreign Application Priority Data
Oct. 6, 2022 (JP) ................................. 2022-161672

(51) Int. Cl.
| | |
|---|---|
| *H02J 50/80* | (2016.01) |
| *H02J 50/12* | (2016.01) |
| *H02J 50/40* | (2016.01) |
| *H02J 50/70* | (2016.01) |

(52) U.S. Cl.
CPC .............. *H02J 50/80* (2016.02); *H02J 50/12* (2016.02); *H02J 50/40* (2016.02); *H02J 50/70* (2016.02)

(58) Field of Classification Search
CPC ....................................................... H02J 50/80
USPC ........................................................... 307/104
See application file for complete search history.

(56) References Cited

U.S. PATENT DOCUMENTS

| | | | | |
|---|---|---|---|---|
| 4,974,179 A | * | 11/1990 | Patton | F23N 5/242 |
| | | | | 713/340 |
| 2016/0190803 A1 | * | 6/2016 | Uno | H02J 1/102 |
| | | | | 307/82 |
| 2016/0211771 A1 | * | 7/2016 | Ichihara | H02M 1/08 |
| 2023/0211670 A1 | * | 7/2023 | Tomita | B60L 5/38 |
| | | | | 191/10 |

* cited by examiner

*Primary Examiner* — Joseph Chang
(74) *Attorney, Agent, or Firm* — Keating & Bennett, LLP

(57) ABSTRACT

In a non-contact power supply system, each of a main power supply device and a sub power supply device includes a timer counter. The main power supply device transmits a square wave to the sub power supply device. The sub power supply device performs interrupt processing when a value of the square wave transmitted from the main power supply device changes to compare a count value of the timer counter at that timing with a determination value, and when the count value is smaller than the determination value, makes a carrier cycle of the timer counter shorter than a predetermined cycle, and when the count value is greater than the determination value, makes the cycle of the timer counter longer than the predetermined cycle.

6 Claims, 8 Drawing Sheets

POWER SUPPLY SYSTEM

BACKGROUND OF THE INVENTION

1. Field of the Invention

The present invention relates to power supply systems.

2. Description of the Related Art

As a conventional power supply system, the system described in Japanese Unexamined Patent Publication No. 5901861 for example, is known. The power supply system described in Japanese Unexamined Patent Publication No. 5901861 includes one main power converter and one or more sub power converters. Each of the power converters includes a time counter and a carrier wave generator configured to generate carrier waves in synchronization with the time counter. The main power converter includes a synchronization data generation section configured to generate synchronization data to synchronize a value of a sub time counter with the main time counter when the time counter reaches a predetermined value, and a communication section configured to transmit the synchronization data to the sub. The sub power converter includes a communication section configured to receive the synchronization data, a time counter correction processing section configured to correct a time counter value based on the synchronization data, a current sensor configured to detect output current of the sub power converter, and a gate timing adjustment section configured to advance or delay a phase of a gate signal of the sub power converter based on an annular current component.

SUMMARY OF THE INVENTION

In conventional power supply systems, synchronization data generated in a synchronization data generation section of a main power converter includes communication time. In the case where the synchronization data includes communication time, it takes time to generate the synchronization data and also to receive the synchronization data. Therefore, in the case of being used for a high frequency power supply, when synchronization control performed in a shorter time is required, for example, appropriate synchronization control may not be achieved.

Example embodiments of the present invention provide power supply systems each capable of accelerating synchronization control between a plurality of power supply devices.

A power supply system according to an example embodiment of the present invention is a power supply system including a first power supply device configured to generate AC current, and at least one second power supply device configured to generate AC current synchronized with a phase of the AC current of the first power supply device, wherein each of the first power supply device and the at least one second power supply device includes a timer counter to count at a predetermined cycle, and generate AC current based on a count value of the timer counter, the first power supply device is configured to transmit, to the at least one second power supply device, a square wave having a first value when the count value of the timer counter is less than a threshold and a second value when the count value is greater than or equal to the threshold, and the at least one second power supply device is configured to perform interrupt processing at a timing at which a value of the square wave transmitted from the first power supply device changes to compare the count value of the timer counter with a determination value, make a cycle of the timer counter shorter than the predetermined cycle when the count value is smaller than the determination value, and make a cycle of the timer counter longer than the predetermined cycle when the count value is larger than the determination value.

In a power supply system according to an example embodiment of the present invention, the at least one second power supply device is configured to perform interrupt processing at a timing at which a value of the square wave transmitted from the first power supply device changes, and compare the count value of the timer counter at that timing with the determination value. The at least one second power supply device is configured to make the cycle of the timer counter shorter than the predetermined cycle when the count value is smaller than the determination value, and make the cycle of the timer counter longer than the predetermined cycle when the count value is larger than the determined value. As described above, in the power supply system, information (data and signals) transmitted from the first power supply device to the at least one second power supply device is a square wave, and thus the time required to create information for synchronization control in the first power supply device can be reduced and also the time required to receive the information in the second power supply device can be reduced. In addition, in the power supply system, it is possible to reduce the time from when the timer counter reaches or exceeds the threshold to when the interrupt processing occurs, thus making it possible to synchronize the first power supply device and the at least one second power supply device in a short time (at a high speed). Therefore, the power supply system can accelerate synchronization control between a plurality of the power supply devices.

In one example embodiment, the determination value may be a value set based on a communication time required for communication between the first power supply device and the at least one second power supply device and the threshold. In this configuration, a determination value is set by taking into account delays and the like that occur in communication between the first power supply device and the at least one second power supply device. Therefore, the power supply system allows the first power supply device and the at least one second power supply device to appropriately synchronize with each other.

In one example embodiment, each of the first value and the second value may be a single bit information. In this configuration, it is possible to determine changes in the value of the square wave with a single bit, thus allowing interrupt processing to occur at high speed.

In one example embodiment, the at least one second power supply device may make the cycle of the timer counter shorter by a predetermined amount than the predetermined cycle when the count value is smaller than the determined value, and may make the cycle of the timer counter longer by a predetermined amount than the predetermined cycle when the count value is greater than the determined value, and after changing the cycle of the timer counter, when the count value is equal to the determination value, may return the cycle of the timer counter to the predetermined cycle. In this configuration, the change in the cycle of the timer counter is limited to a predetermined amount, large changes in the cycle can be reduced or prevented.

In one example embodiment, each of the first power supply device and the at least one second power supply device may supply power in a non-contact manner.

In one example embodiment, each of the first power supply device and the at least one second power supply device may be set by switching control performed in each of first power supply device and the at least one second power supply device, a number may be set for each of the first power supply device and the at least one second power supply device, and switching to the first or the at least one second power supply device may be performed based on a presence or absence of power feed, and the number. In this configuration, the first power supply device and the at least one second power supply device can be set appropriately.

According to example embodiments of the present invention, synchronization control between a plurality of power supply devices can be accelerated.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments according to the present invention will now be described in detail with reference to the attached drawings. In description of the drawings, like or equivalent elements are designated by like reference signs, and duplicate description is omitted.

Figure 1:
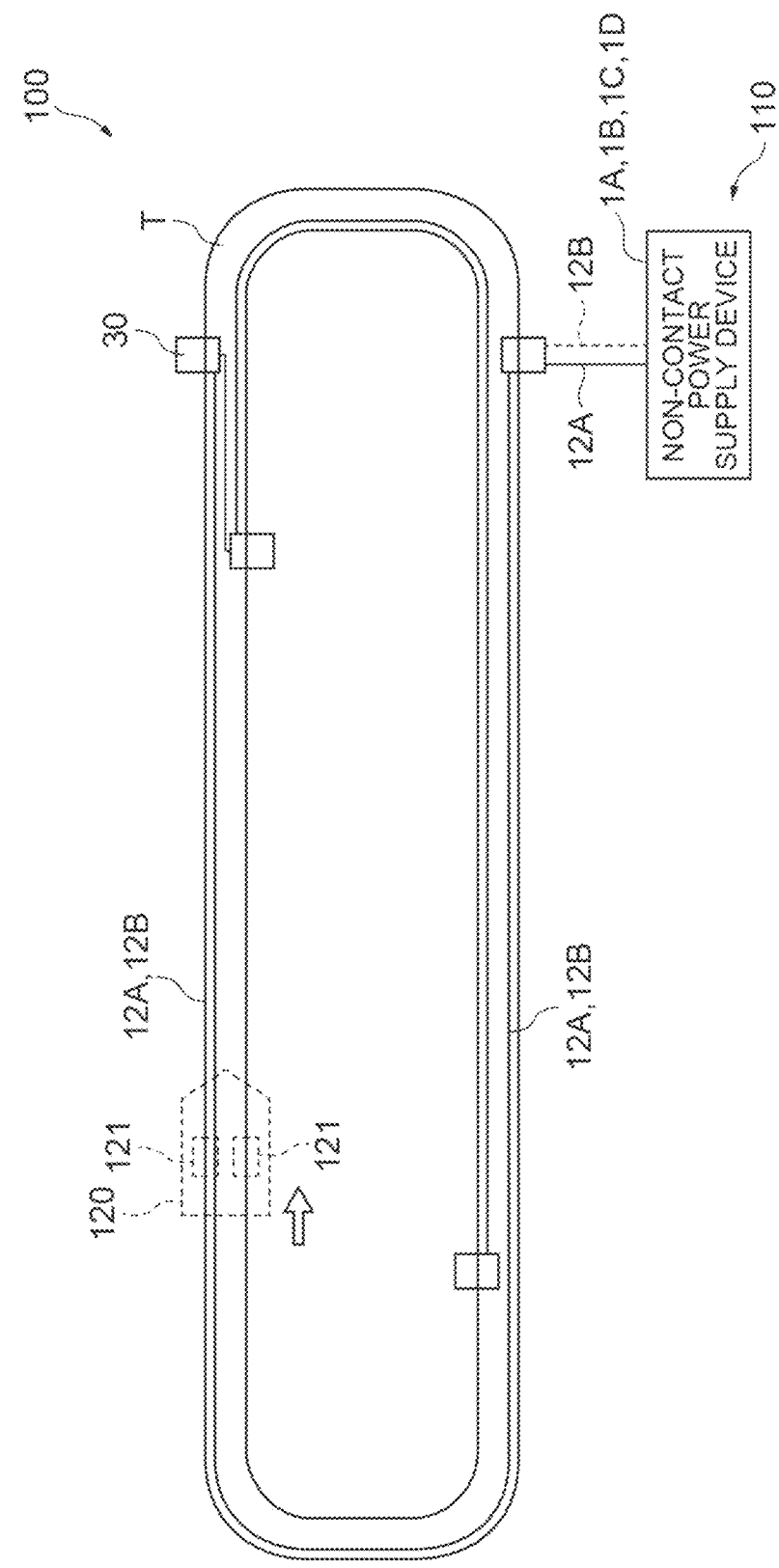
FIG. 1 is a diagram schematically illustrating a track of a transport system including a power supply system according to an example embodiment of the present invention.

As illustrated in FIG. 1, a transport system 100 is a system configured to convey articles using an overhead transport vehicle 120 capable of traveling along a track rail T. The track rail T is a structure on which the overhead transport vehicle 120 travels and is suspended from a ceiling.

The transport system 100 includes a non-contact power supply system (power supply system) 110 and the overhead transport vehicle 120. In the transport system 100, power is supplied in a non-contact manner from feeders 12A and 12B provided on the track rail T to the overhead transport vehicle 120. The overhead transport vehicle 120 travels on electric power supplied by the feeders 12A and 12B. The overhead transport vehicle 120 drives various devices provided in the overhead transport vehicle 120 with the power supplied by the feeders 12A and 12B.

The overhead transport vehicle 120 includes, for example, a ceiling suspended type crane, an overhead hoist transfer (OHT), and the like. Articles include, for example, containers configured to store a plurality of semiconductor wafers, containers configured to store glass substrates, reticle pods, general components, and the like.

The track rail T is, for example, an orbiting track. The overhead transport vehicle 120 travels clockwise on the track rail T. The feeders 12A and 12B are supplied with power from non-contact power supply devices 1A, 1B, 1C, and 1D. The feeders 12A and 12B are disposed below the track rail T and on at least one of a right side and a left side with respect to the center of the track in a traveling direction of the overhead transport vehicle 120. Note that because the feeder 12B is provided below the feeder 12A, the feeder 12B is in a state of being laid below the feeder 12A in FIG. 1.

The feeders 12A and 12B can be rearranged with respect to the track rail T by a switching unit 30. The feeders 12A and 12B are disposed on the left side of the track rail T in an initial area connected to the non-contact power supply devices 1A, 1B, 1C, and 1D. As the overhead transport vehicle 120 travels along the track rail T in the traveling direction, the feeders 12A and 12B are switched in disposition from the left side to the right side of the track rail T by the switching unit 30.

The non-contact power supply system 110 includes the non-contact power supply devices 1A, 1B, 1C, and 1D. The non-contact power supply devices 1A, 1B, 1C, and 1D supply power in a non-contact manner to the overhead transport vehicle 120. The non-contact power supply devices 1A, 1B, 1C, and 1D supply high-frequency currents. The high-frequency is, for example, 9 kHz.

Figure 2:
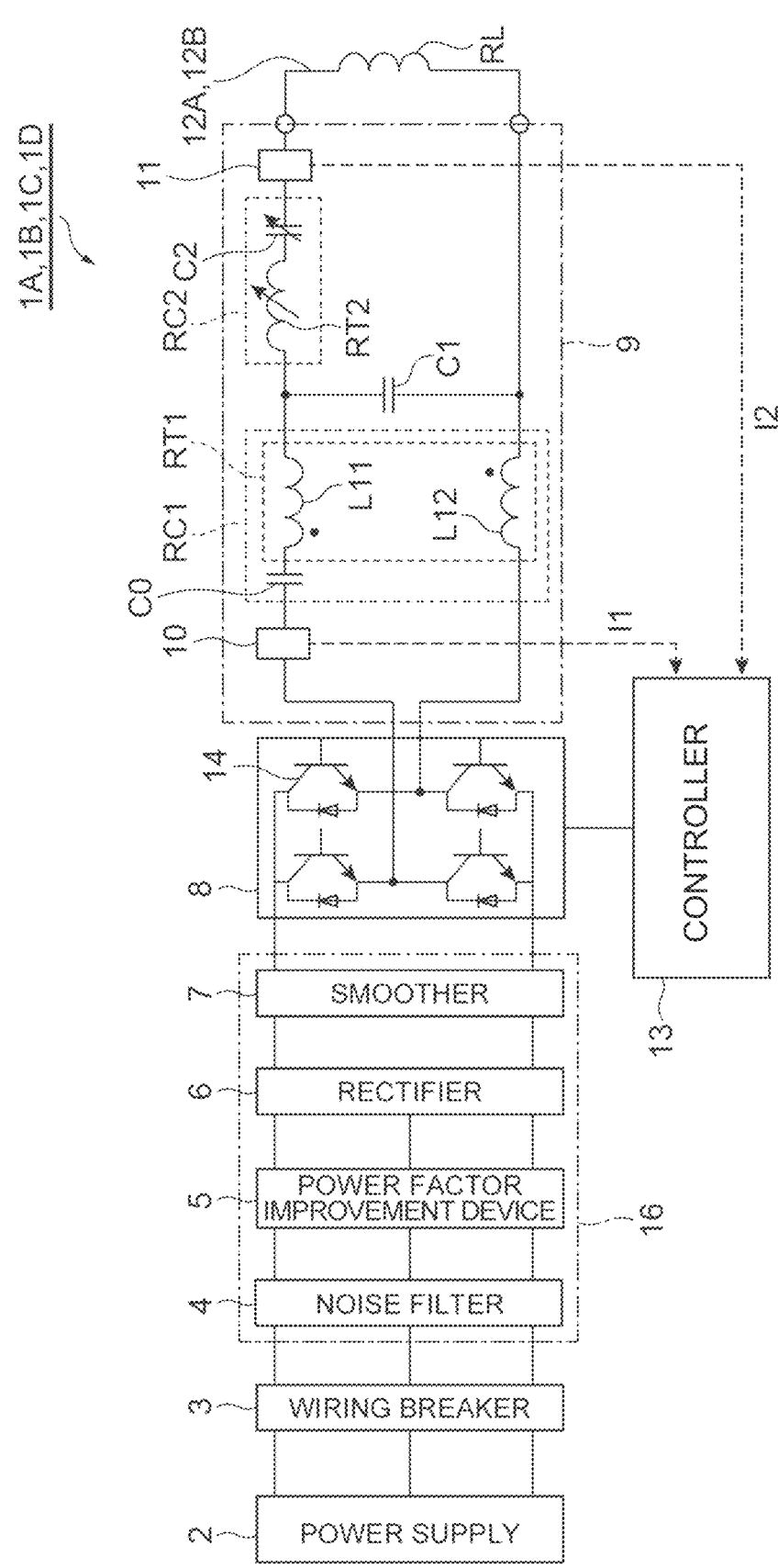
FIG. 2 is a diagram illustrating a configuration of a non-contact power supply device.

As illustrated in FIG. 2, the non-contact power supply devices 1A, 1B, 1C, and 1D include a power supply 2, a wiring breaker 3, a noise filter 4, a power factor improvement device 5, a rectifier 6, a smoother 7, an inverter 8, a filter circuit 9, a first current sensor 10, a second current sensor 11, feeders 12A and 12B, and a controller 13. The noise filter 4, the power factor improvement device 5, the rectifier 6, and the smoother 7 define and function as a power converter 16.

The power supply 2 is a facility to supply AC power, such as a commercial power supply, and supplies AC power (three-phase 200 V). A frequency of the AC power is, for example, 50 Hz or 60 Hz. The wiring breaker 3 opens an electrical circuit when an overcurrent flows. The noise filter 4 removes noise from the AC power. The noise filter 4 is configured by a capacitor, for example. The power factor improvement device 5 improves the power factor by bringing an input current closer to a sine wave. The power factor improvement device 5 is configured by a reactor, for example.

The rectifier 6 converts the AC power supplied from the power supply 2 (power factor improvement device 5) into DC power. The rectifier 6 is configured by a rectifier element, such as a diode, for example. The rectifier 6 may be configured by a switching element such as a transistor. The smoother 7 smooths the DC power converted in the rectifier 6. The smoother 7 is configured by an electrolytic capacitor, for example. A voltage converter may further include a step-up/step-down function.

The inverter 8 converts the DC power output from the smoother 7 into an AC power and outputs it to the filter circuit 9. The inverter 8 changes the magnitude of the AC power output to the filter circuit 9 by changing the switching frequency based on a control signal output from the controller 13. The inverter 8 includes a plurality of switching elements 14. The switching elements 14 are elements capable of switching electrical opening and closing. For example, metal oxide semiconductor field effect transistors (MOSFETs), insulated gate bipolar transistors (IGBTs), bipolar transistors, and the like are used as the switching elements 14.

The filter circuit 9 is provided between the inverter 8 and the feeders 12A and 12B. The filter circuit 9 suppresses harmonic noise. The filter circuit 9 includes a reactor RT1, a capacitor C0, a capacitor C1, a reactor RT2, and a capacitor C2.

The capacitor C0 and the reactor RT1 are connected in series to define a first resonant circuit RC1. The reactor RT1 includes a coil L11 and a coil L12. The reactor RT2 and the capacitor C2 are connected in series to define a second resonant circuit RC2. The first resonant circuit RC1 and the second resonant circuit RC2 are connected in series.

The first current sensor 10 detects a current I1 (inverter current) output from the inverter 8, that is, flowing through the inverter 8. The first current sensor 10 outputs a first current signal indicating the detected current I1 to the controller 13. The second current sensor 11 detects a current I2 (feeding current) of the AC power passing through the second resonant circuit RC2. The second current sensor 11 outputs a second current signal indicating the detected current I2 to the controller 13.

The controller 13 is configured or programmed to control the operation of the inverter 8. The controller 13 may include a computer system or a processor implemented in an integrated circuit. The controller 13 may include a central processing unit (CPU), a read only memory (ROM), a random access memory (RAM), and the like, and an input/output interface and the like. The ROM stores various programs or data.

The controller 13 is connected to the first current sensor 10 and the second current sensor 11 of the filter circuit 9. The controller 13 inputs the first current signal and the second current signal output from the first current sensor 10 and the second current sensor 11, respectively.

The controller 13 controls the magnitude of the AC power (AC current) supplied to the feeders 12A and 12B by controlling the inverter 8, thus controlling the magnitude of power supplied to the overhead transport vehicle 120. In the present example embodiment, the power control is performed, for example, using phase shift control. In the phase shift control, power control parameters are changed to control the magnitude of an AC power. The controller 13 implements phase shift control to change the magnitude (frequency) of the AC power by changing an ON period of the inverter 8. The controller 13 uses drive signals to the plurality of switching elements 14 of the inverter 8 to adjust the switching frequency of each switching element 14, and change the ON period of each switching element 14. The power control parameter in the phase shift control is the ON period of each switching element 14 of the inverter 8.

The controller 13 performs power control so that the value of power transmitted to the overhead transport vehicle 120 is a target value based on the first current signal and the second current signal output from the first current sensor 10 and the second current sensor 11, respectively.

Figure 3:
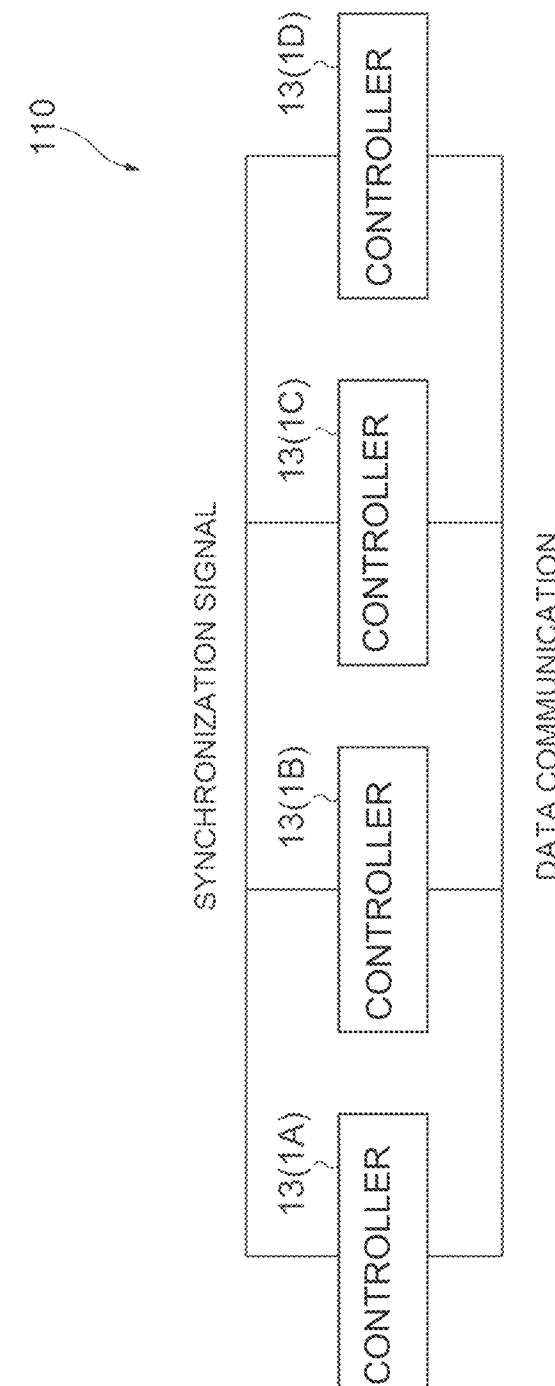
FIG. 3 is a diagram illustrating communication between non-contact power supply devices in the power supply system.

As illustrated in FIG. 3, in the non-contact power supply system 110, the controllers 13 of the non-contact power supply devices 1A, 1B, 1C, and 1D are communicably connected to each other. In the present example embodiment, the controller 13 performs communication, for example, by a half-duplex communication method. Specifically, the controller 13 performs communication, for example, by RS485 communication. The controller 13 performs communication of synchronization signals and data.

The non-contact power supply system 110 synchronizes the current phase of the AC current generated by one of the non-contact power supply devices 1A, 1B, 1C, and 1D with the AC current generated by the other three of the non-contact power supply devices 1A, 1B, 1C, and 1D. The non-contact power supply system 110 synchronizes the current phases of the AC currents of the non-contact power supply devices 1A, 1B, 1C, and 1D, thus reducing or preventing the occurrence of AC current cancellation, or the like in the non-contact power supply devices 1A, 1B, 1C, and 1D.

In the non-contact power supply system 110, the phase of the AC current is synchronized in the non-contact power supply devices 1A, 1B, 1C, and 1D based on synchronization signals transmitted from one of the non-contact power supply devices 1A, 1B, 1C, and 1D to the other three non-contact power supply devices. In the non-contact power supply system 110, one of the non-contact power supply devices 1A, 1B, 1C, and 1D will be the main non-contact power supply device and the other three non-contact power supply devices will be sub non-contact power supply devices, and synchronization signals are transmitted from the main non-contact power supply device to the sub non-contact power supply devices. Hereafter, the main non-contact power supply device transmitting the synchronization signal is referred to as the "main power supply device (an example of the first power supply device)" and the sub non-contact power supply device receiving the synchronization signal is referred to as the "sub power supply device (an example of the second power supply device)".

Figure 4:
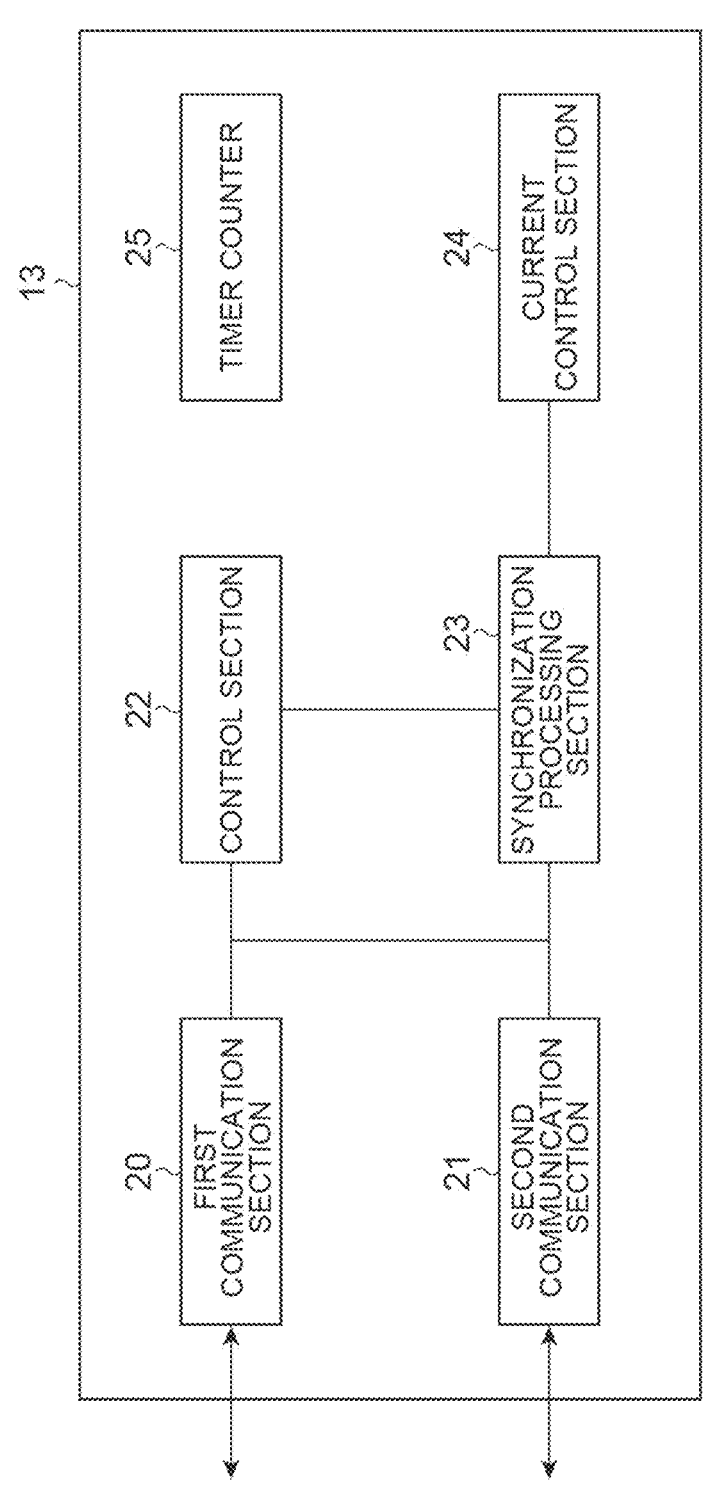
FIG. 4 is a diagram illustrating a configuration of a controller.

As illustrated in FIG. 4, each of the controllers 13 of the non-contact power supply devices 1A, 1B, 1C, and 1D is configured or programmed to include a first communication section 20, a second communication section 21, a control section 22, a synchronization processing section 23, a current control section 24, and a timer counter 25.

The first communication section 20 communicates data with the controllers 13 of the other non-contact power supply devices 1A, 1B, 1C, and 1D. The first communication section 20 transmits and receives data. In the present example embodiment, the first communication section 20 performs communication using a half-duplex communication method. The first communication section is switchable between transmission mode and reception mode.

The first communication section 20 of the main power supply device stands by in the reception mode, switches to the transmission mode at a predetermined timing, and transmits query data to the sub power supply device. The first communication section 20, when receiving response data transmitted from the sub power supply device in the reception mode, outputs the response data to the control section 22.

The first communication section 20 of the sub power supply device stands by in the reception mode and switches to the transmission mode when receiving the query data transmitted from the main power supply device. The first communication section 20 transmits the response data created in response to the receipt of the inquiry data to the main power supply device. The response data can include data indicating the status and the like of the device (presence or absence of power feed, power on/off).

The second communication section 21 communicates synchronization signals with the controllers 13 of the other non-contact power supply devices 1A, 1B, 1C, and 1D. The second communication section 21 transmits and receives synchronization signals. In the present example embodiment, the second communication section 21 performs communication using the half-duplex communication method (see FIG. 4). The second communication section 21 is switchable between transmission mode and reception mode. Switching between transmission mode and reception mode in the second communication section 21 is performed by the control section 22.

In the case of the main power supply device, the second communication section 21 is in transmission mode to transmit synchronization signals, and transmits synchronization signals output from the current control section 24 to the sub power supply devices. The second communication section 21 transmits a synchronization signal whose value changes between binary values of Hi and Low at regular intervals (for example, 100 μs).

In the case of the sub power supply device, the second communication section 21 is in the reception mode to receive synchronization signals, and receives synchronization signals. The second communication section 21 of the sub power supply device receives synchronization signals at intervals of, for example, 100 μs. The second communication section 21 outputs the received synchronization signals to the synchronization processing section 23.

The control section 22 switches between the main power supply device and the sub power supply device. The control section 22, in the case of switching to the main power supply device, sets the second communication section 21 to transmission mode and disables synchronization processing in the synchronization processing section 23. The control section 22, in the case of switching to the sub power supply device, sets the second communication section 21 to reception mode and also enables the synchronization processing in the synchronization processing section 23.

The control section 22 switches between the main power supply device and the sub power supply device based on the presence or absence of power feed and the numbers set for the non-contact power supply devices 1A, 1B, 1C, and 1D. In the present example embodiment, for example, a number "1" is set for the non-contact power supply device 1A, "2" for the non-contact power supply device 1B, "3" for the non-contact power supply device 1C, and "4", for the non-contact power supply device 1D.

In the switching processing in the control section 22, priorities are set for the presence or absence of power feed and the numbers for the non-contact power supply devices 1A, 1B, 1C, and 1D. In the present example embodiment, the first priority is set to the presence or absence of power feed and the second priority is set to the numbers for the non-contact power supply devices 1A, 1B, 1C, and 1D. In other words, the power feed presence or absence has a higher priority than the numbers for the non-contact power supply devices 1A, 1B, 1C, and 1D. The control section 22 switches between main and sub based on the presence or absence of power feed at the non-contact power supply devices 1A, 1B, 1C, and 1D and the numbers for the non-contact power supply devices 1A, 1B, 1C, and 1D.

The control section 22 switches between main and sub by polling processing for the other non-contact power supply devices 1A, 1B, 1C, and 1D. The control section 22 acquires a status of another device through the polling processing and switches between main and sub. Specifically, the control section 22 switches between main and sub based on a polling record and a response record to the polling record. The control section 22, when switching from the main power supply device to the sub power supply device, transmits a record of main request to another device. The control section 22, when receiving a record of main acceptance from another device, switches to the sub power supply device.

The control section 22 of the other device switches to the main power supply device in response to the transmission of the record of main acceptance.

Figure 5:
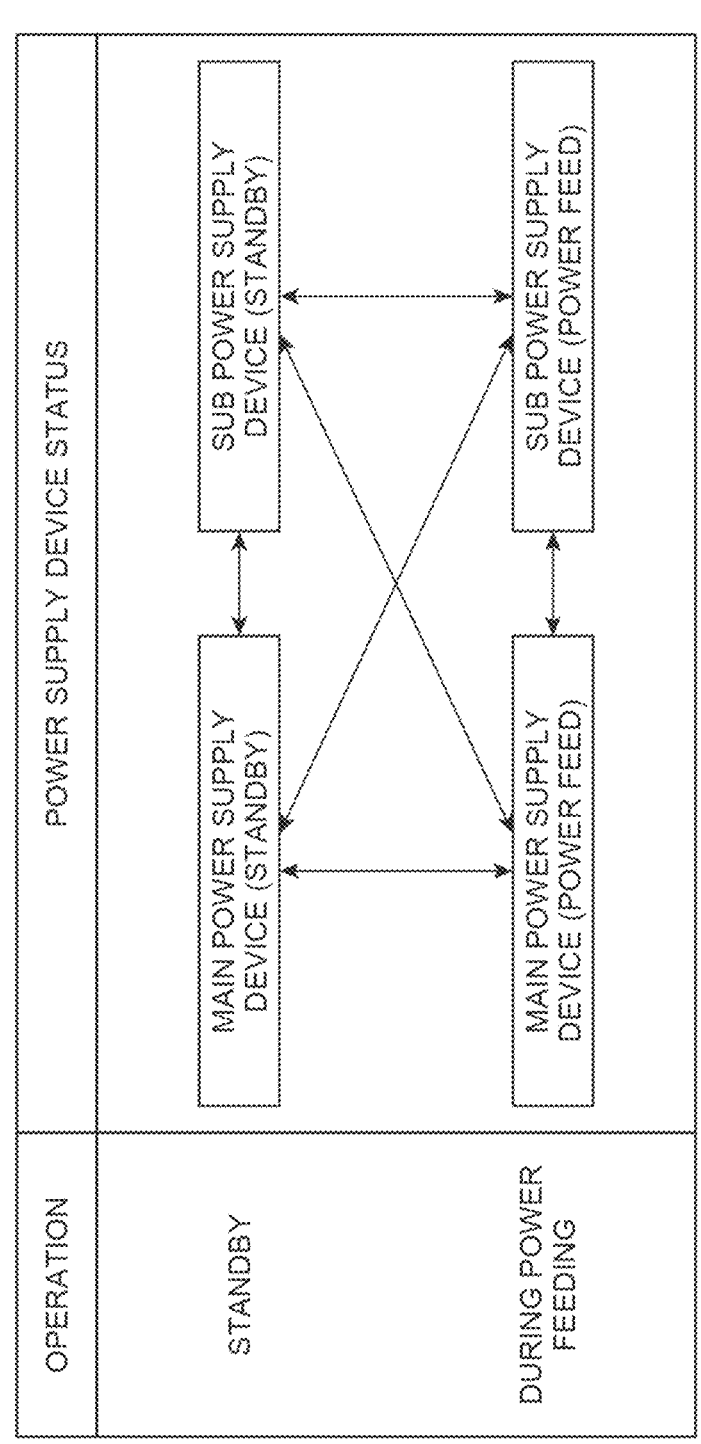
FIG. 5 is a diagram illustrating a relationship between an operation of a power supply device and a state of the non-contact power supply device.

An example of switching between main and sub in the control section 22 is described with reference to FIG. 5. As illustrated in FIG. 5, the control section 22 switches the non-contact power supply devices 1A, 1B, 1C, and 1D between four statuses: main power supply device (power feed), sub power supply device (power feed), main power supply device (standby), and sub power supply device (standby).

For example, the control section 22 of each of the non-contact power supply devices 1A, 1B, 1C, and 1D performs switching so that when the non-contact power supply devices 1A and 1C are on standby (standby without power feed) and the non-contact power supply devices 1B and 1D are performing power feeding, the non-contact power supply device 1B will be the main power supply device (power feed) and the non-contact power supply devices 1A, 1C and 1D will be sub power supply devices (standby, power feed). For example, the control section 22 of each of the non-contact power supply devices 1A, 1B, 1C, and 1D performs switching so that when the non-contact power supply device 1C is on standby and the non-contact power supply devices 1A, 1B, and 1D are performing power feeding, the non-contact power supply device 1A will be the main power supply device (power feed) and the non-contact power supply devices 1B, 1C, and 1D will be sub power supply devices (standby, power feed).

For example, the control section 22 of each device performs switching so that in the relationship between the non-contact power supply device 1A and the non-contact power supply device 1B, when the non-contact power supply device 1A is on standby and the non-contact power supply device 1B is performing power feeding, the non-contact power supply device 1A will be a sub power supply device (standby) and the non-contact power supply device 1B will be the main power supply device (power feed). When the non-contact power supply device 1B enters a standby mode, the control section 22 of each device performs switching so that the non-contact power supply device 1A will be the main power supply device (standby) and the non-contact power supply device 1B will be a sub power supply device. When the non-contact power supply device 1A then starts power feeding and subsequently the non-contact power supply device 1B starts performing power feeding, the control section 22 of each device performs switching so that the non-contact power supply device 1A will be the main power supply device (power supply device) and the non-contact power supply device 1B will be a sub power supply device (power feed).

For example, in the relationship between the non-contact power supply device 1A and the non-contact power supply device 1B, when the non-contact power supply device 1A is performing power feeding and the non-contact power supply device 1B is on standby, the control section 22 of each device performs switching so that the non-contact power supply device 1A will be the main power supply device (power feed) and the non-contact power supply device 1B will be a sub power supply device (standby). When the non-contact power supply device 1A then enters a standby mode, the control section 22 of the non-contact power supply device 1A performs switching so that the non-contact power supply device 1A will be the main power supply device (standby). When the non-contact power supply device 1A then starts power feeding and subsequently the non-contact power supply device 1B starts power feeding, the control section 22 of each device performs switching so that the non-contact power supply device 1A will be the main power supply device (power supply device) and the non-contact power supply device 1B will be a sub power supply device (power feed).

For example, in the relationship between the non-contact power supply device 1A and the non-contact power supply device 1B, when the non-contact power supply device 1A is performing power feeding and the non-contact power supply device 1B is on standby, the control section 22 of each device performs switching so that the non-contact power supply device 1A will be the main power supply device (power feed) and the non-contact power supply device 1B will be a sub power supply device (standby). When the non-contact power supply device 1B then starts power feeding, the control section 22 of the non-contact power supply device 1B performs switching so that the non-contact power supply device 1B will be a sub power supply device (power feeding). When the non-contact power supply device 1A then enters a standby mode, the control section 22 of each device performs switching so that the non-contact power supply device 1A will be a sub power supply device (standby) and the non-contact power supply device 1B will be the main power supply device (power feed). When the non-contact power supply device 1A then starts power feeding, the control section 22 of each device performs switching so that the non-contact power supply device 1A becomes the main power supply device (feeding power) and the non-contact power supply device 1B becomes a sub power supply device (power feed).

As illustrated in FIG. 3, the synchronization processing section 23 synchronizes the carrier cycles of the sub power supply devices based on the synchronization signal transmitted from the main power supply device. The synchronization processing section 23 corrects the carrier cycle of the sub power supply device based on the count value of the timer counter 25 and the synchronization signal. The Timer counter 25 counts at a constant (predetermined) carrier cycle. In the present example embodiment, the constant carrier cycle is 9 kHz. In other words, in the timer counter 25, a predetermined cycle of the carrier cycle is set at 9 kHz. However, the predetermined cycle is not limited to 9 kHz and may be any other frequency.

Figure 6:
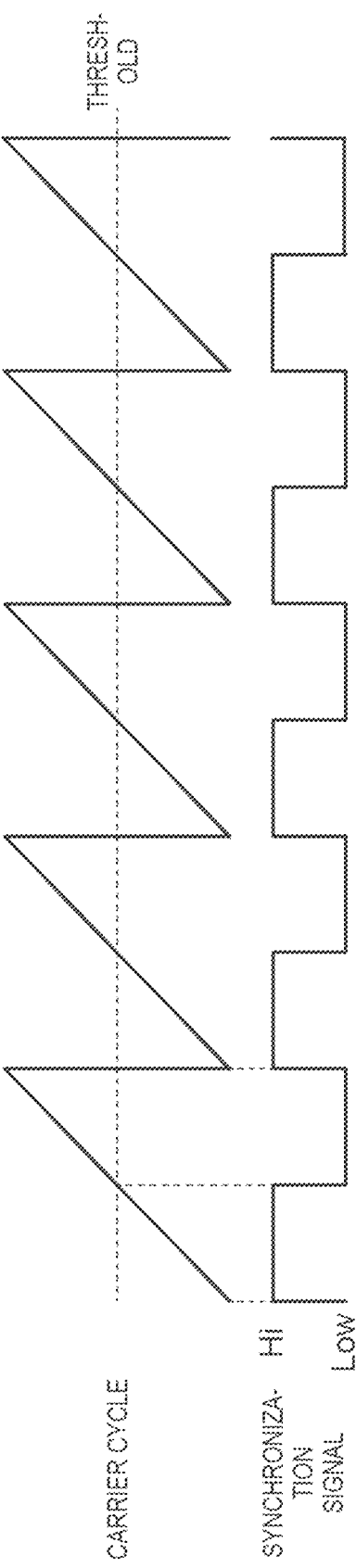
FIG. 6 is a diagram illustrating a carrier cycle and a synchronization signal.

FIG. 6 is a diagram illustrating the carrier cycle and the synchronization signals in the timer counter 25. As illustrated in FIG. 6, the carrier cycle is a sawtooth wave. The synchronization signal is a square wave. In the present example embodiment, the synchronization signal is a U-phase positive-phase signal. The synchronization signal is Hi (an example of the first value) when the count value of the timer counter 25 is less than the threshold, and is Low (an example of the second value) when the count value is greater than or equal to the threshold. Hi and Lo are 1-bit information. As illustrated in FIG. 6, the timer counter 25 counts up in one cycle of the synchronization signal.

The synchronization processing section 23 performs interrupt processing at the timing at which the value of the synchronization signal transmitted from the main power supply device changes, and compares the count value of the timer counter 25 at that timing with the determination value. The synchronization processing section 23 stores the determination values. The determination value is set arbitrarily by the user. The determination value is a value set based on the communication time required for communication between the main power supply device and the sub power supply device and the control delay time for the synchronization processing at the sub power supply device and the threshold.

The communication time may include a delay time. The determination value is set to an intermediate value (threshold) of the carrier cycle as an initial value. The user changes (corrects) the determination value from the initial value by making a predetermined input (operation).

Figures 7A, 7B:
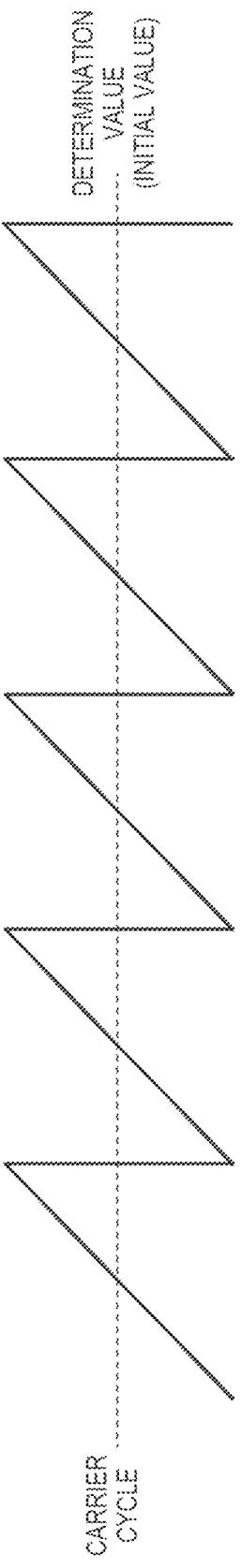
FIGS. 7A and 7B are diagrams illustrating examples of determination values in the carrier cycle.

FIGS. 7A and 7B are diagrams illustrating examples of the determination values. FIG. 7A illustrates an example where the determination value is the initial value. FIG. 7B illustrates an example where the determination value is a correction value. In the example illustrated in FIG. 7B, the determination value has a count value higher than that of the initial value (the intermediate value of the carrier cycle).

The synchronization processing section 23, when receiving a synchronization signal output from the second communication section 21, performs interrupt processing. Specifically, the synchronization processing section 23 performs interrupt processing at a falling edge (falling from Hi to Low) of the synchronization signal. The synchronization processing section 23 compares the falling edge of the synchronization signal with the counter of the carrier cycle and performs synchronization processing based on the comparison result.

The synchronization processing section 23 does not change the carrier cycle when the counter value is equal to the determination value (counter value=determination value) in the comparison result. The synchronization processing section 23 makes the carrier cycle shorter by a predetermined amount than the predetermined cycle when the counter value is smaller than the determination value (counter value<determination value) in the comparison result. The predetermined amount is, for example, 0.5 μs. The synchronization processing section 23 makes the carrier cycle longer by a predetermined amount than the predetermined cycle when the counter value is greater than the determination value (counter value>determination value) in the comparison result. The predetermined amount is, for example, 0.5 μs. After changing the carrier cycle of the timer counter 25, when the counter value is equal to the determination value (counter value=determination value) in the comparison result, the synchronization processing section 23 returns the carrier cycle to the predetermined cycle. Note that the term "equivalent" in the present example embodiment may include not only being equal, but also values including minor differences within a predetermined range being regarded as equivalent.

Figure 8:
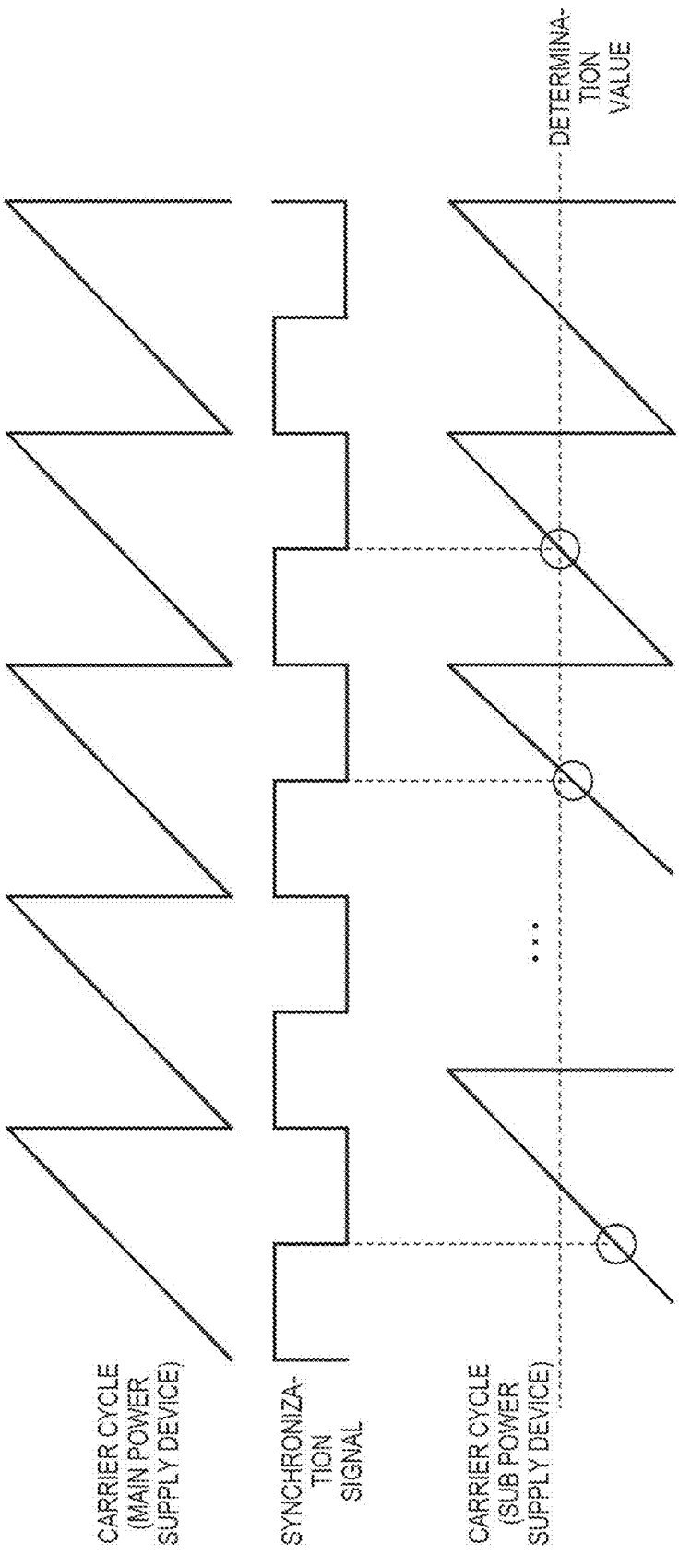
FIG. 8 is a diagram explaining synchronization processing.

For example, the synchronization processing section 23 shortens the carrier cycle by a predetermined amount when the counter value is smaller than the determination value, as indicated by P1 in FIG. 8. When the counter value is still smaller than the determination value, as indicated by P2 in FIG. 8, the synchronization processing section 23 keeps the carrier cycle short by a predetermined amount. The synchronization processing section 23 sets the carrier cycle to a predetermined cycle when the counter value becomes equal to the determination value, as indicated by P3 in FIG. 8. In other words, the synchronization processing section 23 returns the carrier cycle to the predetermined cycle when the counter value and the determination value match as a result of the carrier cycle change.

The current control section 24 controls the current in the non-contact power supply devices 1A, 1B, 1C, and 1D. The current control section 24 generates AC current based on the count value of the timer counter 25. In the case of the main power supply device, the current control section 24 causes the sub power supply device to transmit synchronization signals via the second communication section 21. In the case of the sub power supply device, the current control section 24 synchronizes the timer counter 25 based on the synchronization signal output from the synchronization processing section 23 and generates AC current based on the count value of the timer counter 25.

As explained above, in the non-contact power supply system 110 of this example embodiment, the sub power supply device generates the interrupt processing at the timing at which the value of the square wave, which is the output signal transmitted from the main power supply device, changes, and compares the count value of the timer counter at that timing with the determination value. The sub power supply device makes the carrier cycle of the timer counter 25 shorter than the predetermined cycle when the count value is smaller than the determination value in the comparison result, and makes the carrier cycle of the timer counter 25 longer than the predetermined cycle when the count value is larger than the determined value in the comparison result. As described above, in the non-contact power supply system 110, information (data and signals) transmitted from the main power supply device to the sub power supply device is a square wave, and thus the time required to create information for synchronization in the main power supply device can be reduced and also the time required to receive the information in the sub power supply device can be reduced. In addition, in the non-contact power supply system 110, it is possible to reduce the time from when the timer counter 25 reaches or exceeds the threshold to when the interrupt processing occurs, thus making it possible to perform synchronization of the main power supply device and the sub power supply device in a short time (at a high speed). Therefore, the non-contact power supply system 110 can accelerate synchronization control between a plurality of the power supply devices.

In the non-contact power supply system 110 according to the present example embodiment, the determination value is a value set based on a communication time required for communication between the main power supply device and the sub power supply device and a threshold. In this configuration, the determination value is set by taking into account delays and other factors that occur in communication between the main power supply device and the sub power supply device. Therefore, the non-contact power supply system 110 allows the main power supply device and the sub power supply device to appropriately synchronize with each other.

In the non-contact power supply system 110 according to the present example embodiment, each of Hi and Low values of the synchronization signals is single bit information. In this configuration, it is possible to determine changes in the value of the synchronization signal with a single bit, thus allowing interrupt processing to occur at high speed.

In the non-contact power supply system 110 according to the present example embodiment, the sub power supply device may make the carrier cycle of the timer counter 25 shorter by a predetermined amount than the predetermined cycle when the count value is smaller than the determined value in the comparison result, and may make the carrier cycle of the timer counter longer by a predetermined amount than the predetermined cycle when the count value is greater than the determined value in the comparison result, and after changing the S carrier cycle of the timer counter 25, when the count value is equal to the determination value in the comparison result, the cycle of the timer counter 25 may be returned to the predetermined cycle. In this configuration, the change in the cycle of the timer counter 25 is limited to a predetermined amount, and thus large changes in the carrier cycle can be reduced or prevented.

In the non-contact power supply system 110 according to the present example embodiment, the control section 22 of the controller 13 switches between the main power supply device and the sub power supply device based on the presence or absence of power feed and the numbers set for the non-contact power supply devices 1A, 1B, 1C, and 1D. In this configuration, it is possible to appropriately switch between the main power supply device and the sub power supply device.

Although some example embodiments according to the present invention have been described above, the present invention is not limited to the above-described example embodiments, and various modifications can be made within the scope not departing from the gist of the present invention.

In the above example embodiments, a configuration in which the non-contact power supply system 110 is applied to the transport system 100 is described as an example. However, the non-contact power supply system 110 may be applied to other systems.

In the above example embodiments, a configuration in which the power supply system is a non-contact power supply system 110 configured to supply power in a non-contact manner is described as an example. However, the form of power supply in a power supply system is not limited to non-contact.

In the above-described example embodiments, a configuration in which the non-contact power supply system includes the four non-contact power supply devices 1A, 1B, 1C, and 1D is described as an example. The non-contact power supply system 110 includes the at least two non-contact power supply devices.

In the above example embodiments, a configuration in which the synchronization processing section 23 performs interrupt processing at the falling edge (falling from Hi to Low) of the synchronization signal is described as an example. However, the synchronization processing section 23 may perform interrupt processing at the rising edge (rising from Low to Hi) of the synchronization signal.

In the above-described example embodiments, a configuration in which the traveling vehicle is the overhead transport vehicle 120 is described as an example. However, a moving body is not limited to an overhead transport vehicle, but can be any traveling vehicle traveling on the track rail T. For example, the traveling vehicle may be a floor transport vehicle (floor traveling vehicle). If the traveling vehicle is a floor transport vehicle, track rails are laid on a floor.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A power supply system comprising:
   a first power supply device configured to generate AC current; and
   at least one second power supply device each configured to generate AC current synchronized with a phase of the AC current of the first power supply device; wherein
   each of the first power supply device and the at least one second power supply device includes a timer counter to count at a predetermined cycle, and generate AC current based on a count value of the timer counter;
   the first power supply device is configured to transmit, to the at least one second power supply device, a square wave having a first value when the count value of the timer counter is less than a threshold and a second value when the count value is greater than or equal to the threshold; and the at least one second power supply device is configured to:

perform interrupt processing at a timing at which a value of the square wave transmitted from the first power supply device changes to compare the count value of the timer counter with a determination value;

make a cycle of the timer counter shorter than the predetermined cycle when the count value is smaller than the determination value; and make a cycle of the timer counter longer than the predetermined cycle when the count value is larger than the determination value.

2. The power supply system according to claim 1, wherein the determination value is a value set based on a communication time required for communication between the first power supply device and the at least one second power supply device and the threshold.

3. The power supply system according to claim 1, wherein each of the first value and the second value is single bit information.

4. The power supply system according to claim 1, wherein the at least one second power supply device is configured to:

make the cycle of the timer counter shorter by a predetermined amount than the predetermined cycle when the count value is smaller than the determination value;

make the cycle of the timer counter longer by a predetermined amount than the predetermined cycle when the count value is greater than the determination value; and after changing the cycle of the timer counter, when the count value is equal to the determination value, return the cycle of the timer counter to the predetermined cycle.

5. The power supply system according to claim 1, wherein each of the first power supply device and the at least one second power supply device is configured to supply power in a non-contact manner.

6. The power supply system according to claim 1, wherein each of the first power supply device and the at least one second power supply device is set by switching control performed in each of the plurality of power supply devices;

a number is set for each of the first power supply device and the at least one second power supply device; and switching to the first power supply device or the at least one second power supply device is performed based on a presence or absence of a power feed, and the number.

* * * * *